7/14/81 XR 4,278,974

United States Patent [19]

Kondo

[11] 4,278,974

[45] Jul. 14, 1981

[54] DRIVING SYSTEM OF DISPLAY

[75] Inventor: Kenichi Kondo, Tokyo, Japan

[73] Assignee: Kabushiki Kaisha Daini Seikosha, Tokyo, Japan

[21] Appl. No.: 24,442

[22] Filed: Mar. 27, 1979

[30] Foreign Application Priority Data

Apr. 6, 1978 [JP] Japan ............................... 53-40523

[51] Int. Cl.$^3$ ............................................ G06F 3/147

[52] U.S. Cl. .................................. 340/784; 340/752; 340/798; 340/814; 350/333

[58] Field of Search ............... 340/784, 752, 763, 771, 340/798, 814

[56] References Cited

U.S. PATENT DOCUMENTS

| | | | |
|---|---|---|---|
| 3,895,372 | 7/1975 | Kaji et al. | 340/784 |
| 3,973,252 | 8/1976 | Mitomo et al. | 340/784 |
| 4,127,848 | 11/1978 | Shanks | 340/784 |
| 4,145,685 | 3/1979 | Farina | 340/798 X |

*Primary Examiner*—David L. Trafton

*Attorney, Agent, or Firm*—Robert E. Burns; Emmanuel J. Lobato; Bruce L. Adams

[57] ABSTRACT

A driving system for matrix display device having X electrodes and Y electrodes for displaying at selected crossing points of the electrodes is provided with a timing signal generator for controlling the X electrode scanning signals, a display signal converter receptive of a portion of display information addressed by a signal from the time signal generator for converting the display information into a portion of the signals for display. A memory device stores the portion of the signals for display and applies the same to the driving circuit for the Y electrodes. The drive to the Y electrodes is inhibited while information to be stored is being stored in the memory.

7 Claims, 6 Drawing Figures

DRIVING SYSTEM OF DISPLAY

BACKGROUND OF THE INVENTION

This invention relates to a driving system for a display in which X electrodes and Y electrodes are arranged in a matrix configuration, and for treating display information such as that relating to character, numeral or configuration in a time sharing manner.

It is necessary that the electronic circuit of a multifunctional electronic timepiece dynamically processes the display information which is stored in a shift register, in order to decrease the number of circuit elements and for the simplification of these elements. Additionally, the interface between a shift register and a driving circuit has many problems for producing a dot matrix display.

FIG. 1 shows a conventional dynamic logic circuit for an electronic timepiece in which the oscillating signal produced by oscillating circuit 1 is divided by dividing circuit 2 and the divided signal is provided to adder 3 and then to the shift registers 4 and 5. The divided signal cycles in the adder 3 and the shift registers 4 and 5 which act to count time. The shift register 4 consists of 4 bits and the serial signals of 4 bits are provided to the decoder 6 in parallel so as to be converted to display signals. The converted display information is taken out at every 4 bits and is stored in shift register 7. The output signal of the shift register 7 is applied to driving circuit 8 and the driving signal of the driving circuit 8 drives liquid crystal display 9. As mentioned above, in the case where the liquid crystal display is activated in the conventional manner, the transfer time of the Y electrode display signal is required for a predetermined time during which the shift register 7 stores the display information of all digits, because the 4 bits of information signal of the shift register 4 is converted into the display signals by the decoder 6 and the display signals are stored in the shift register 7 in turn, at the scanning time selecting one of the X electrodes.

Accordingly, the driving voltage of the X electrode cannot be synchronized with the driving voltage of the Y electrode. The display 9 is effected through the driving circuit 8 by a transfer pulse which transfers the display information to the shift register 7. From the above, the quality of the display becomes bad in view of the contrast and the cross-talk phenomenon. It is disadvantageous that the consumption of the current is great in the liquid crystal display since the transfer pulse is transferred with a considerable high frequency. It has been proposed that the driving system for the liquid crystal display store the display signals of all the digits in a memory circuit after the display signals are filled in the shift register and that it make the driving voltage scanning the X electrodes synchronous with the driving voltage scanning the Y electrodes, so that it needs double memories in order to eliminate the effect of the transfer pulse and the variation of effective voltage depending on the non-synchronization. However, in such a system, the number of circuit elements are increased, since double memories are required.

SUMMARY OF THE INVENTION

It is an object of this invention to provide a driving system for a dot matrix display which produces a simplification of the circuit construction and a good display quality, and which eliminates the undesired problems relating to a dynamic driving system.

It is another object of this invention to provide a driving system for a matrix type display for displaying a numeral by applying voltages to intersecting points of X electrodes and Y electrodes comprising a timing signal generating circuit for producing scan signals for the X electrodes, a display signal converter circuit for converting display information addressed by a signal of said timing signal generating circuit to a display signal, a memory circuit for storing an output of the display signal converter circuit in turn, a driving circuit for the Y electrodes, a driving circuit for the X electrodes, the display driving being inhibited during reading display information into the memory circuit corresponding to the Y electrodes.

DESCRIPTION OF THE PREFERRED EMBODIMENT

Figure 1:
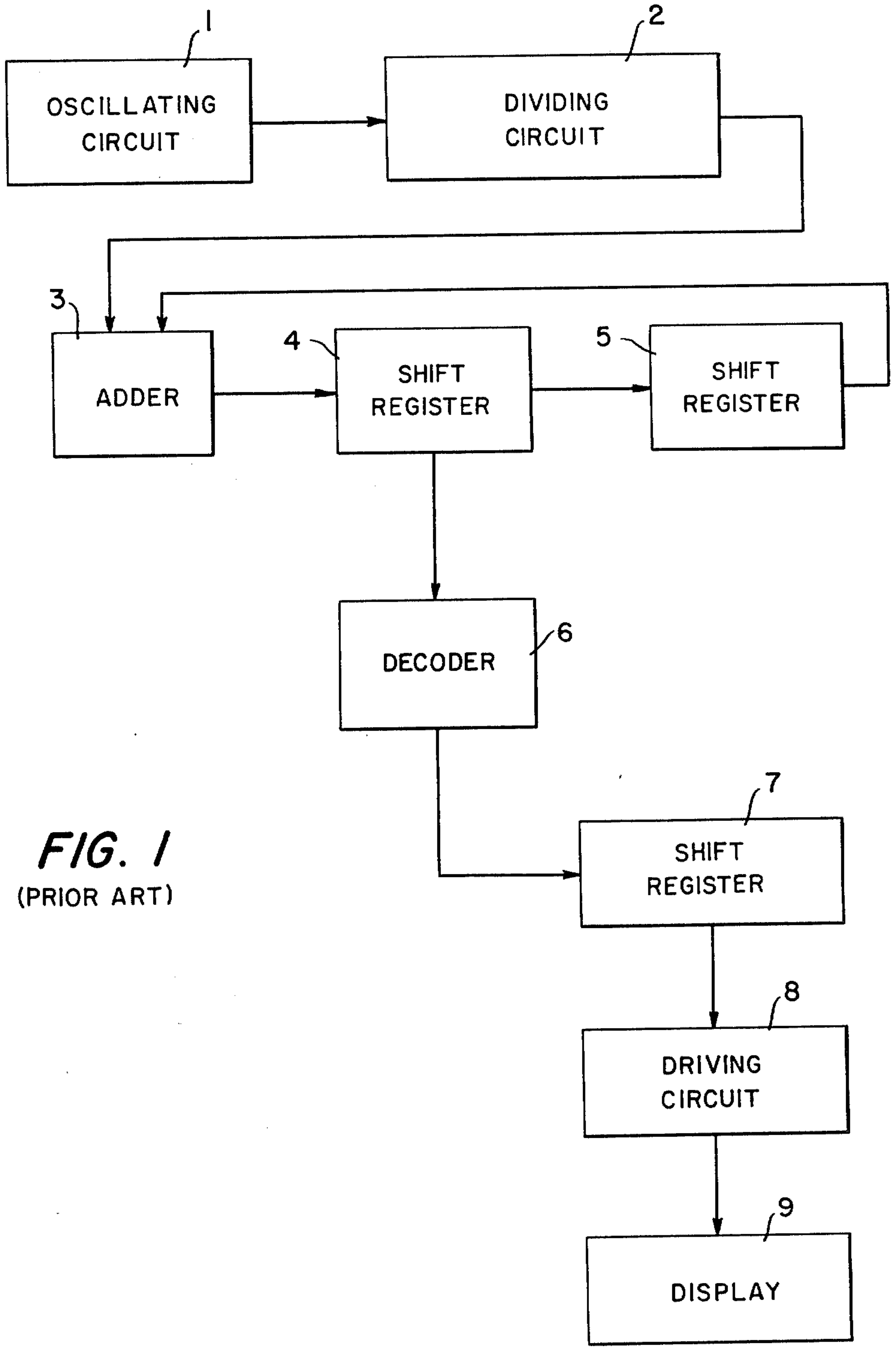
FIG. 1 (PRIOR ART)
FIG. 1 shows a block diagram of a conventional display system.
Figure 2:
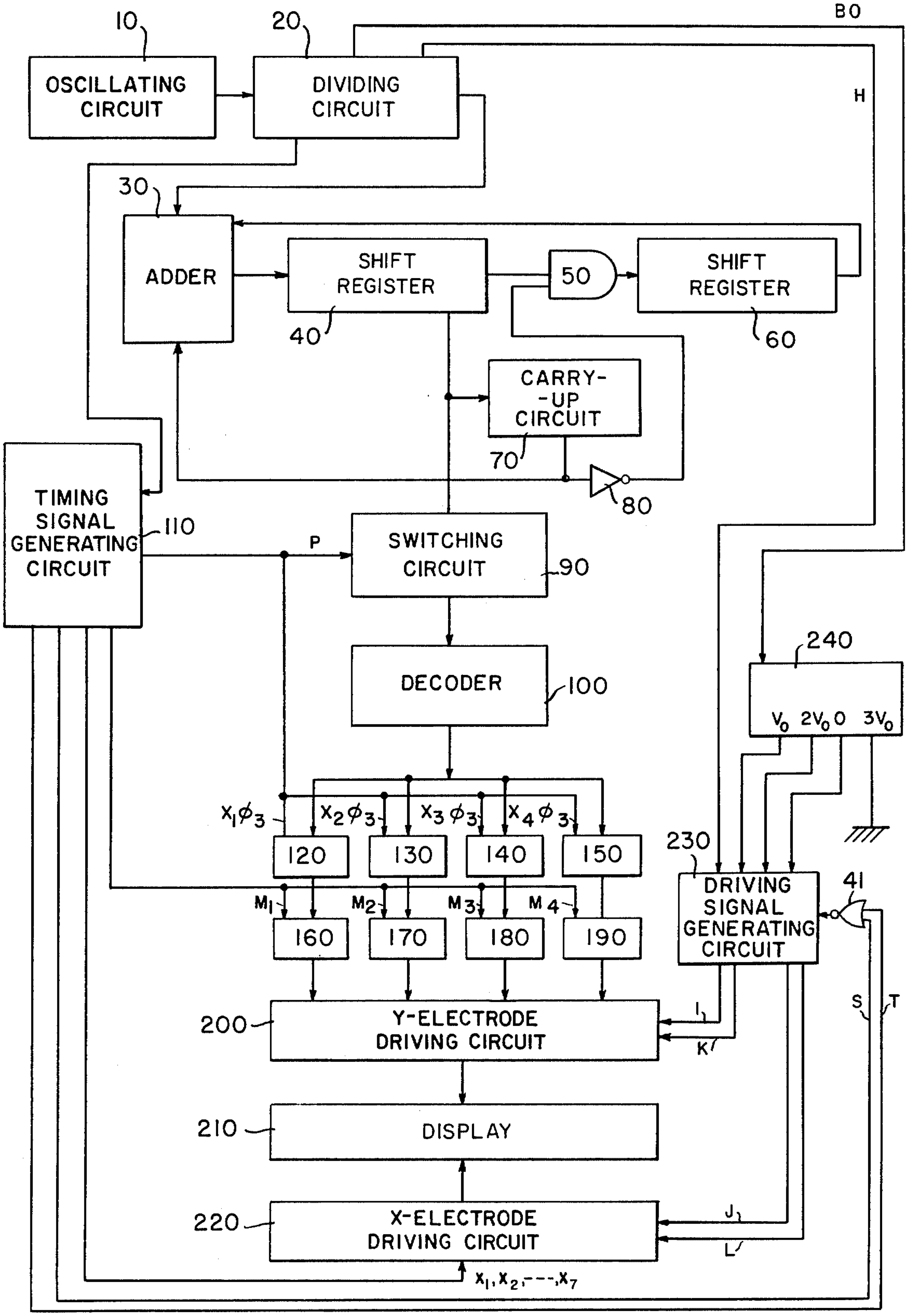
FIG. 2 is a schematic diagram showing an embodiment of the invention.

FIG. 2 is a schematic diagram showing an embodiment of the present invention.

An oscillating circuit 10 is the circuit for generating the oscillating signal serving as the standard frequency.

A dividing circuit 20 is the circuit for dividing the oscillating signal serving as the standard frequency.

An adder 30, a 4-bit shift register 40, a shift register 60, a carry-up-circuit 70, an AND circuit 50 and inverter 80 comprise the logic operation circuitry and time counting circuitry wherein the information of one digit includes the 4-bit information of the shift register 40.

A switching circuit 90 is the circuit for providing a 4-bit serial signal in parallel from the shift register 40 to the decoder.

A decoder 100 is the circuit for converting the display information (BCD signal) to a display signal.

Multiplexers 120–150 are circuits for distributing the display signals to each digit by switching the display information in a time sharing manner.

Memory circuits 160–190 are circuits for storing the display signal, and driving signal generating circuit 230 provides the Y electrode driving signal and X electrode driving signal to Y electrode driving circuit 200 and X electrode driving circuit 220 respectively.

A display 210 is a dot matrix display of which X electrodes are connected to X electrode driving circuit 220.

The X electrodes are scanned in turn by the scanning signal of timing signal generating circuit 110.

The Y electrodes are connected to Y electrode driving circuit 200 and receive the driving voltage in response to the display signal. The timing signal generating circuit 110 is the circuit for generating the timing signals of switching circuit 90, decoder 100, multiplexers 120–150, memory circuits 160–190 and X electrode driving circuit 220 by using the divided frequency signals of the dividing circuit 20.

The information of the shift registers 40 and 60 are cycled and in the case a carry is required, the output of the carry-up circuit 70 is added to the adder 20 whereby the 4-bit information is reset to logic level "0" by the inverter 80 and the AND circuit 30 as soon as the carry is carried up to the upper digit.

As mentioned above, the operation of the time count is effectuated. In order to simplify the description, the invention will be referred to with respect to 4 digits.

The respective digit outputs of 4-bit shift register 40 are input to the switching circuit 90 being in the ON state with the timing of the gate signal P.

The content of the decoder 100 is addressed and applied to the multiplexers in synchronization with the scanning of the X electrodes.

The decoder 100 converts BCD signals for the respective digits to the display signals. As the multiplexers 120–150 go into the ON state in turn, the content of the decoder 100 is stored in the memory circuits 160–190.

The memory circuits 160–190 respectively are composed of a latch circuit. The timing signal for latching is provided by the timing signal generating circuit 110. The memory circuits respectively have the contents for digits of the decoder 100 stored at timing points $M_1$–$M_4$.

The display signals stored in the memory circuits 160–190 are maintained in storage until the next X electrode scan.

When the next X electrode scan is effected, the abovedescribed timing pulses $X_1\Phi_3$–$X\Phi_4$ are produced whereby the next display signal is stored in the memory circuits 160–190.

Figure 3:
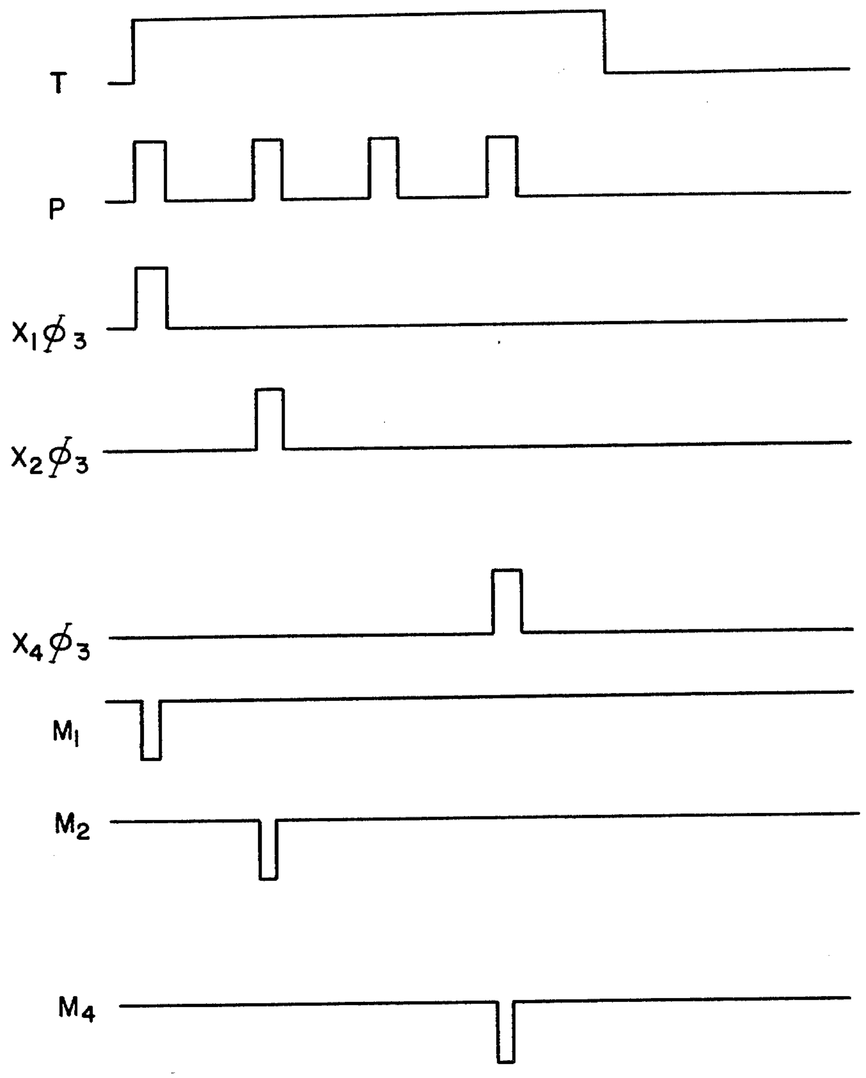
FIG. 3 is a series of waveforms showing the timing of FIG. 2.

The required transfer time T is shown in the waveform T of FIG. 3. The waveform P of FIG. 3 shows the timing of the gate signal P of the switching circuit 90.

Figure 4:
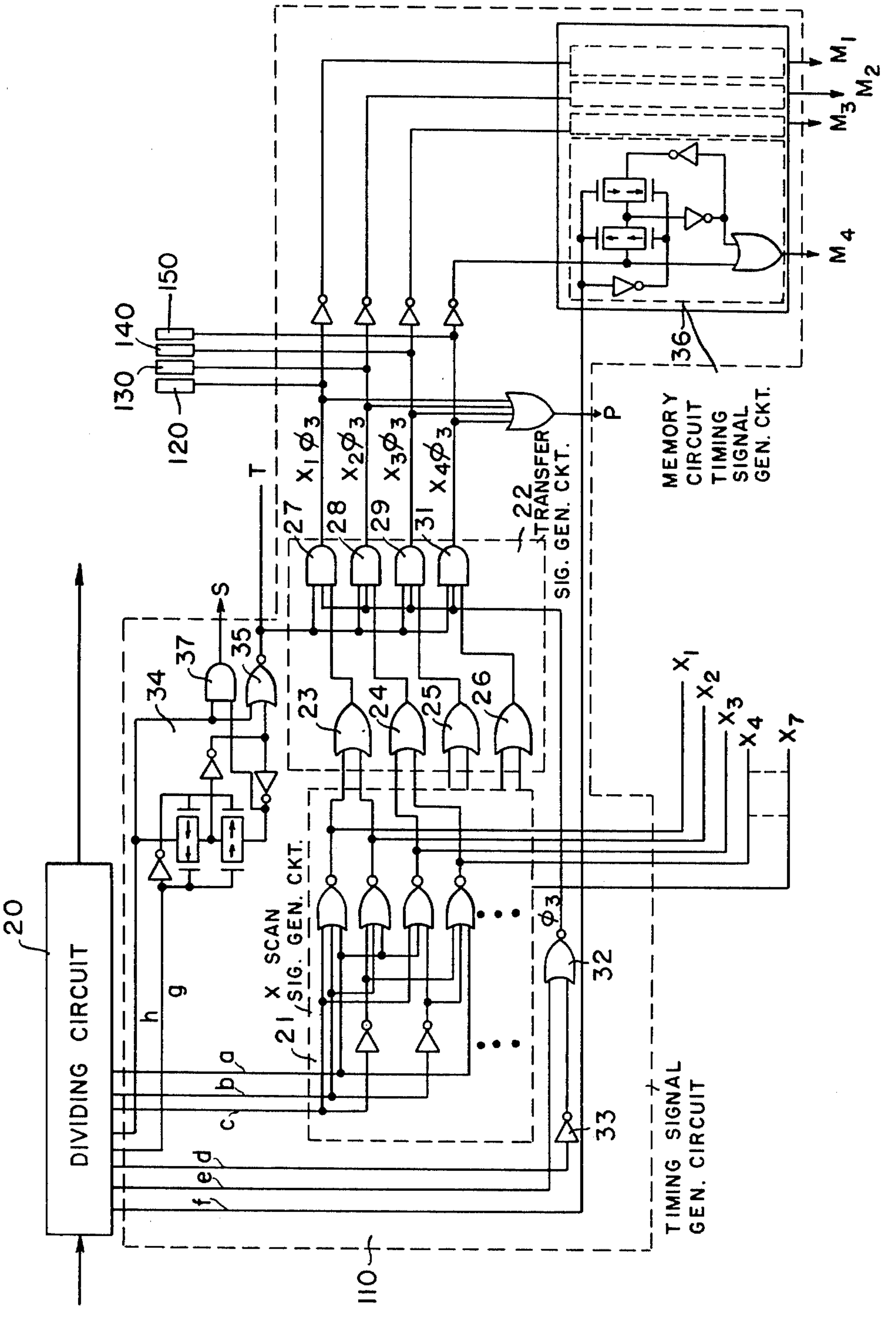
FIG. 4 is a timing signal generating circuit according to the invention.

FIG. 4 is a circuit showing an embodiment of the timing signal generating circuit 110 which produces the timing waveforms T, P, $X_1\Phi_3$–$X_4\Phi_3$ and $M_1$–$M_4$ of FIG. 3.

The X scan signal generating circuit 21 is composed of inverters and NOR circuits. The scan signals $X_1$–$X_7$, which are different from one another in phase, are produced by using the divided signals a, b and c of the dividing circuit 20 and these scan signals are used as the address signal of the decoder 100 and the X electrode scan signal.

The transfer signal generating circuit 22 is composed of the OR circuits 23–26 and the AND circuits 27–29 and 31. The transfer pulse signals $X_1\Phi_3$–$X_4\Phi_3$ are produced at the timing of the bit pulse signal $\Phi_3$ of the NOR circuit 32. The transfer pulse signals $X_1\Phi_3$–$X_4\Phi_3$ respectively are produced as only one pulse when the X electrode is scanned since the transfer time signal T is a limited time.

The transfer time signal generating circuit 34 which is composed of a latch circuit, latches the divided signal h with the divided signal g when the divided signal h falls from the logic level "1" to the logic level "0". The NOR circuit 35 produces the transfer time signal T.

It is desirable that the pulse width of the transfer time signal T is in the range of 6–50% with respect to each pulse width of the scan signals $X_1$–$X_7$. The memory circuit-timing signal generating circuit 36, which is composed of a latch circuit, receives the signals which are the inverted signals of the timing signals $X_1\Phi_3$–$X_4\Phi_3$ and uses the divided signal f as a control signal. As a result, the memory circuit timing signal generating circuit 36 produces the timing signals $M_1$–$M_4$ for the memory circuits 160–190.

As it has been known that the voltage average method is applied as the display driving method, the operation of the voltage average method, for example, the $\frac{1}{3}$ biased driving method, will be described.

Figure 5:
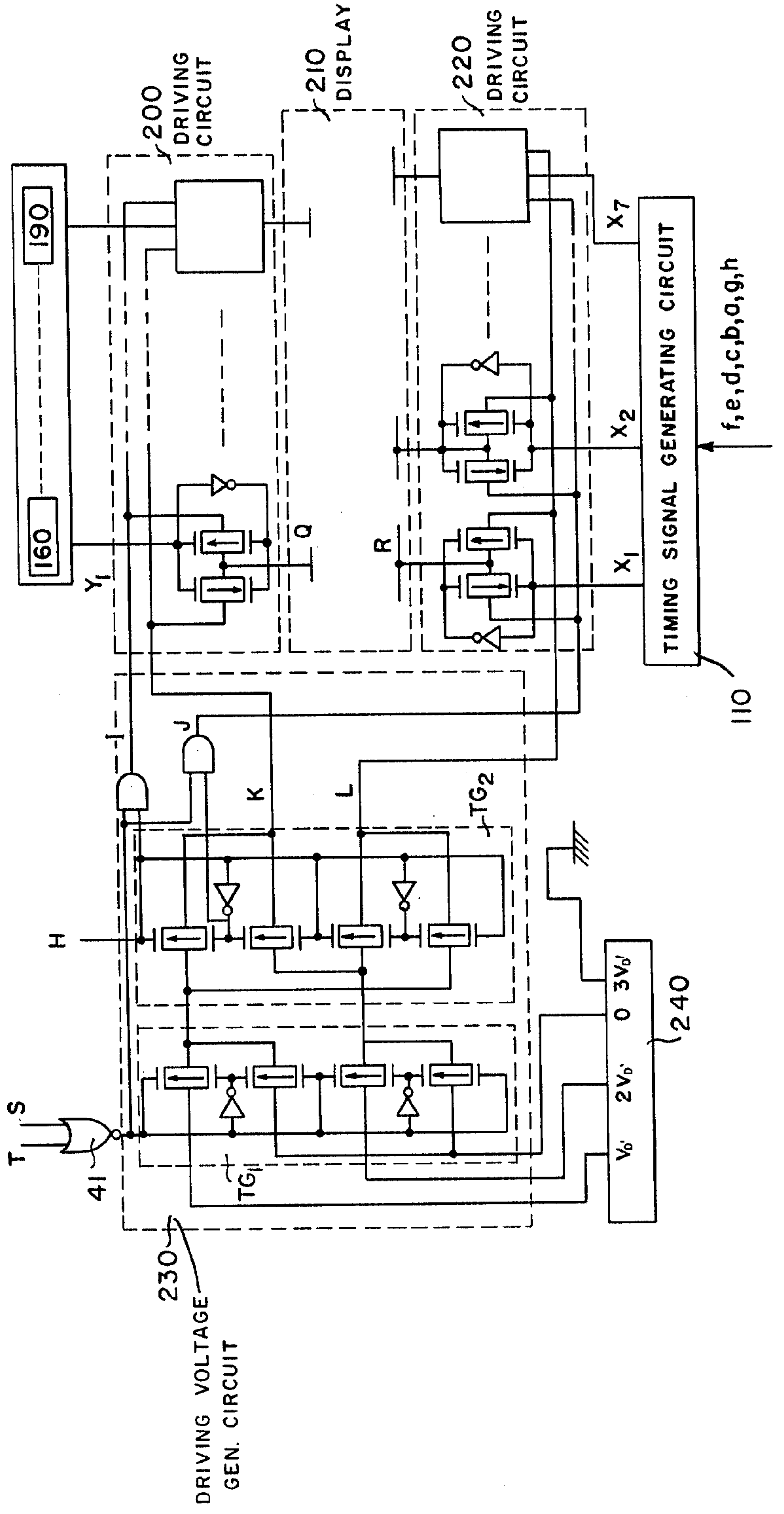
FIG. 5 shows an embodiment of a driving circuit according to the invention.

FIG. 5 shows a driving circuit using the $\frac{1}{3}$ biased driving method. In FIG. 5, the reference numeral 240 is the boosting circuit which produces the voltage levels of 2 $V_d$ and 3 $V_d$ from the battery voltage $V_d$. The reference numeral 110 is the timing signal generating circuit which produces the scan signal for scanning the X electrode.

The reference numerals 160–190 are the memory circuits for storing the display signal. The reference numeral 230 is the driving voltage generating circuit. The reference numeral 200 is the Y electrode driving circuit and 220 is the X electrode driving circuit.

The respective voltage levels of 0,$V_d$ and 2 $V_d$ are provided to the first transmission group of the driving voltage generating circuit 230 and are controlled by the output signal of the NOR circuit 41 which receives the output signal T of the NOR circuit 35 and the output signal S of the AND circuit 37. The NOR circuit 35 and the AND circuit 37 are included in the transfer time signal generating circuit 34.

The output signal of the first transmission gate is provided to the second transmission group and is controlled by the divided signal H.

Figure 6:
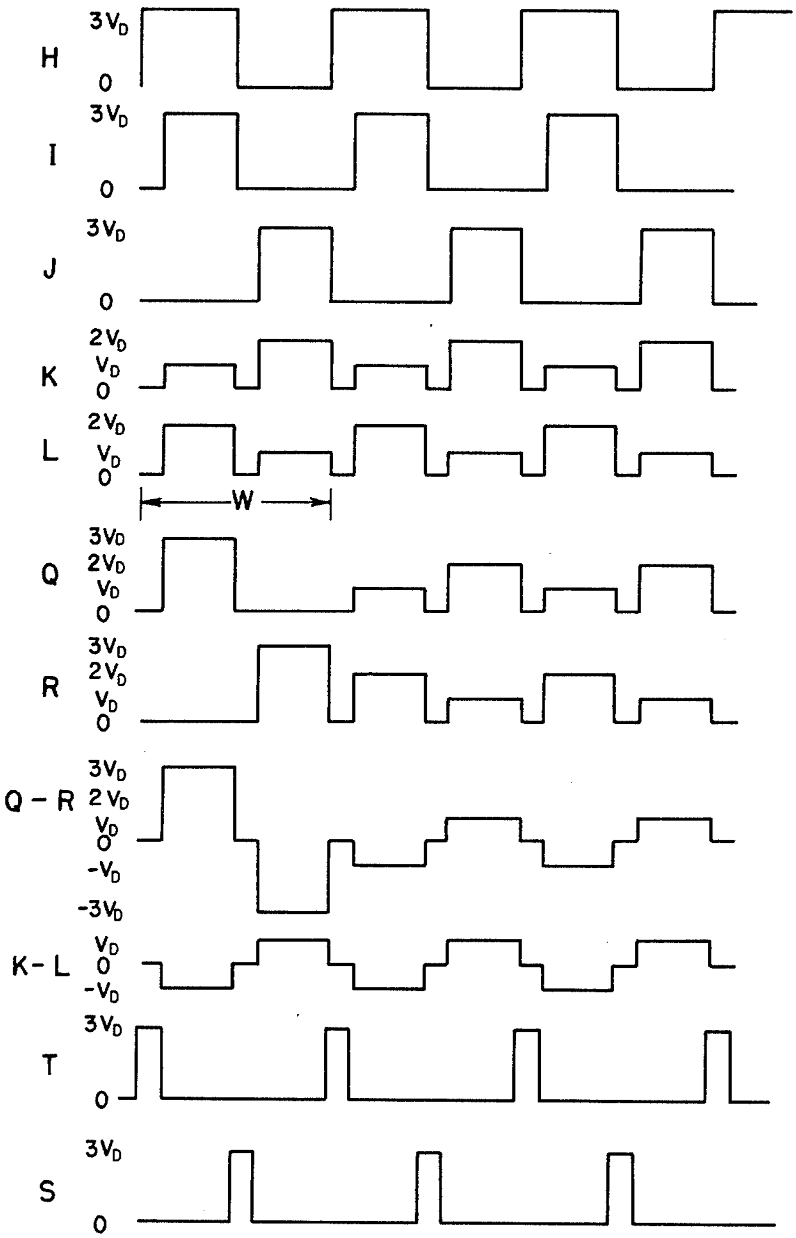
FIG. 6 is a series of waveforms showing the operation of FIG. 5.

FIG. 6 is a timing chart showing the signal waveforms of the driving signal generating circuit 230 shown in FIG. 5.

The period of the divided signal H is synchronized with the selection time of the address of the decoder 100 and of the X electrode.

The signal waveforms I and K are the input signals of the Y electrode driving circuit 200, and the signal waveforms J and L serve as the input signals of the X electrode driving circuit 220.

Accordingly, when $X_1$ of the X electrode and $Y_1$ of the Y electrode are selected, the signals R and Q are produced respectively during one frame time. The voltage shown in Q-R of FIG. 6 is applied to the intersecting point between $X_1$ electrode and $Y_1$ electrode and the voltage shown in K-L is applied to the non-selecting point.

Accordingly, a display with good contrast may be obtained by making the effective voltage of Q-R over the threshold voltage and the effective voltage of K-L below the threshold voltage.

As described above, in accordance with this invention, it is advantageous that the cross-talk phenomenon which is a defect in the conventional system is eliminated and that the quality of the contrast is improved, since the driving voltage is inhibited during the transfer time so that the transfer pulse of high frequency does not affect the display at all in the display system for operating logically with a dynamic logic circuit. Further, the driving system of this invention may eliminate an increase in the current consumption depending upon the high frequency signal. Also, in accordance with this invention, it is advantageous that the circuit construction is simplified since the double memory circuits are not required.

Accordingly, a multifunctional timepiece may be fabricated at low cost. Still further, it is advantageous that the dissipation current may be decreased to about 63% to that of the conventional multiplexed driving system having a 100% duty cycle ratio and which does not have the zero bias time for discharging the charged electric charge in the case of a capacitive load such as a liquid crystal, since the driving system of this invention has the zero bias time when the voltage applied to the display is inverted. Also, the quality of the driving system for the liquid crystal is determined by the operating margin ($\alpha = \text{Von}/V_{off}$), where Von is the effective voltage applied to the selection point and Voff is the effective voltage applied to the non-selection point.

It is advantageous that the display system according to this invention may make the electro-optical characteristic of the liquid crystal adaptable to the effective voltage for driving by adjusting the transfer time without lowering the operating margin $\alpha$.

Although the driving system of the display relating to an electronic timepiece has been described as an embodiment, the scope of the invention includes the driving system of the X-Y matrix type display used for an electronic calculator, a liquid crystal television receiver, or the like. Also, the spirit of this invention is not limited, although the logical operation system using a shift register is described as an embodiment of this invention.

I claim:

1. An apparatus comprising: a matrix display device with X electrodes and Y electrodes arranged in point-like displays at selected crossing points of the X and Y electrodes; and a display device driving system comprising timing signal generating means for controlling the X electrode scanning signals, display signal converter means receptive of a portion of the display information addressed by said timing signal generating means for converting the display information into a portion of the signals for display, a driving circuit for the Y electrodes, memory means for storing the portion of the signals for display for applying to the driving circuit for the Y electrodes, and means controlled by said timing signal generating means for inhibiting the drive to the Y electrodes while information to be stored is being stored in the memory means.

2. An apparatus as claimed in claim 1; wherein the generating means produces a transfer time signal whose duration is equal to the transfer time and the inhibiting means is receptive of the transfer time signal for effecting inhibition.

3. An apparatus as claimed in claim 1; wherein the display signal converter means comprises a decoder and switching means for applying the output of the decoder for display to a predetermined portion of the memory means.

4. An apparatus as claimed in claim 1; wherein the memory means comprises latching circuits.

5. A driving system for a matrix display device having X electrodes and Y electrodes, the system comprising: an X-electrode driving circuit; an actuatable Y-electrode driving circuit; means for applying display data to the Y-electrode driving circuit comprising a single memory for storing the display data and having the outputs thereof connected to the inputs of the Y-electrode driving circuit, and a multiplexer for feeding the display data into the memory; and timing signal generating means for effecting the loading of data into the memory during a predetermined transfer time and inhibiting the Y-electrode driving circuit during said transfer time and for effecting the driving of the Y-electrodes by the Y-electrode driving circuit and the simultaneous scanning of the X electrodes by the X-electrode driving circuit after the transfer time.

6. The system according to claim 5; wherein the memory comprises latching circuits.

7. The system according to claim 5; wherein the timing signal generating means produces a transfer signal having the duration of the transfer time for effecting inhibition of the Y-electrode driving circuit.

* * * * *